April 23, 1940.    J. TJAARDA    2,198,354
MOTOR VEHICLE
Filed Jan. 9, 1937
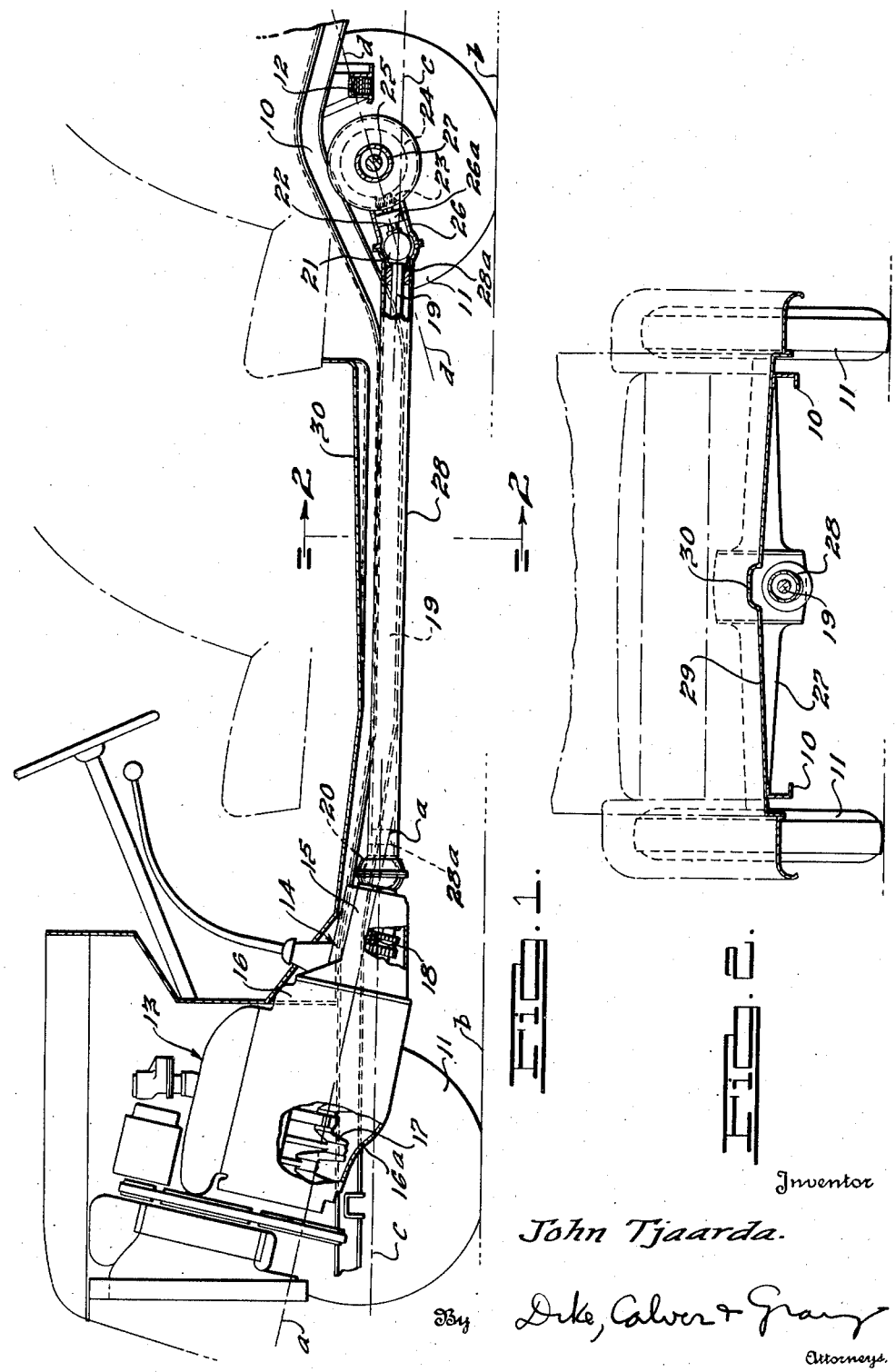
Inventor
John Tjaarda.
By Dike, Calvert & Gray
Attorneys.

Patented Apr. 23, 1940

2,198,354

UNITED STATES PATENT OFFICE 2,198,354

MOTOR VEHICLE

John Tjaarda, Birmingham, Mich., assignor to Briggs Manufacturing Company, Detroit, Mich., a corporation of Michigan Application January 9, 1937, Serial No. 119,731

21 Claims. (Cl. 180—73)

This invention relates to motor vehicles and more particularly to such motor vehicles as have their engines mounted at the opposite end from the driving wheels, such, for instance, as motor vehicles having front mounted engines and rear mounted final drives. The present application is a continuation-in-part of my co-pending applications Serial No. 85,219, filed June 15, 1936, and Serial No. 94,648, filed August 6, 1936.

One of the objects of the present invention is to lower the front end of the propeller shaft and to dispose the same substantially horizontally or more nearly so than heretofore, thereby enabling the floor structure of the vehicle to be lowered.

Another object of the invention is to decrease the height of the open-bottom tunnel usually provided in the floor structure of the passenger compartment of the vehicle in order to permit upward movements of the rear end of the propeller shaft.

Still another object of the invention is to eliminate the tunnel or arched portion provided in the floor structure of the vehicle above the front end of the propeller shaft.

A further object of the invention is to decrease the angle formed by the respective axes of the transmission shaft and the propeller shaft, thereby decreasing operation stresses in the universal joint provided between said shafts.

A still further object of the invention is to lower the heavier parts of the chassis and of the body structure, thereby lowering the center of gravity of the vehicle and increasing stability of the vehicle.

A still further object of the invention is to lower the entire body structure of the vehicle, thereby causing the same to be supported nearer its center of gravity as well as nearer the line of action of the resultant force produced by the air resistance of the body structure.

It is an added object of the present invention to provide an improved structure of the above character which is relatively simple in construction and is simple to manufacture and repair.

Other objects of this invention will appear in the following description and appended claims, reference being had to the accompanying drawing forming a part of this specification wherein like reference characters designate corresponding parts in the several views.

Fig. 1 is a side elevation, partly in section, of the chassis and the floor structure of a motor vehicle embodying the present invention.

Fig. 2 is a transverse sectional view taken in the direction of the arrows on the line 2—2 of Fig. 1.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is shown, by way of example, a rear driven motor vehicle having an engine mounted at its front, said vehicle having a rear mounted final drive of the spiral bevel gear type. However, it is to be expressly understood that my invention is not limited in its broader aspects to rear driven motor vehicles or to any particular type of drive, and that it is capable of being applied to motor vehicles having other types of drives, such as worm and gear drive, or to vehicles having different types of engine and driving axle mountings.

Referring to the drawing wherein a preferred embodiment of my invention is illustrated, the numeral 10 indicates a frame of the motor vehicle supported by wheels 11 and suitable springs 12. An engine 13 is mounted in front of the frame 10 with the aid of conventional mounting means. At the rear end of said engine 13 there is operatively arranged a transmission 14, the housing 15 of which is secured to the housing 16 of the engine. The engine 13 includes a power shaft, in the present instance a crankshaft 17, operatively supported at the crank case 16a of the engine. The transmission 14, which in the present instance is of a conventional type, includes a main transmission shaft 18 arranged coaxially with said crankshaft 17 and drivingly connected thereto. Thus, the respective axes of said crankshaft 17 and said transmission shaft 18 coincide, the line representing said coinciding axes being indicated in Fig. 1 by the characters a—a.

It is to be noted that the axes of the crankshaft and the transmission shaft form an angle with respect to the ground line b—b which in the present instance is attained by lowering the rear end of the engine and transmission assembly.

At the rear end of the transmission shaft 18 there is provided a propeller shaft 19, the front extremity of which is connected to said transmission shaft 18 by means of a universal joint 20. The rear extremity of said propeller shaft is connected by means of a universal joint 21 to a final drive shaft 22 carrying a pinion 23 meshing with a ring gear 24 attached to a differential (not shown) and driving the axle shafts 25.

The major axis c—c of said propeller shaft 19 normally extends substantially parallel to the ground line b—b, although in operation said major axis moves because of vertical movements of the rear extremity of said propeller shaft 19. The major axis d—d of said final drive shaft 22 forms an angle with the ground line b—b, and, therefore, the angle which is formed by the axis c—c of the propeller shaft 19 and the axis d—d of said final drive shaft 22 is less than 180°, the vertex of said angle being directed downward. The angularity between said shafts 19 and 22 is maintained constant by means of a final drive shaft housing 26 enclosing said final drive shaft 22. The rear end of said housing 26 is secured to the rear axle housing 27 while the front end thereof is rigidly attached to the tubular propeller shaft housing 28. The front end of said propeller shaft housing 28 is rotatably secured in the front universal joint 20 in a manner well known in the art, thereby allowing the housing 28 to follow the movements of the propeller shaft 19. A preferred construction of the universal joint, well known in the art, comprises, in effect, two universal joints, one universally connecting the transmission and the propeller shafts, and the other universally connecting the housing 28 to the transmission housing, both of said joints having a common center. Within the housings 26 and 28 there is provided a number of suitable bearings 26a and 28a for the purpose of operatively supporting shafts 19 and 22. Housings 26 and 28 are rigidly secured at the universal joint 21, which ensures constant angularity between the shafts 19 and 22. By virtue of this construction, the propeller shaft 19, the final drive shaft 22 as well as the housings 28 and 26 and the entire rear axle of the vehicle is made movable as a unit around a point in said universal joint 20 as a center, the vertical movements of the rear axle being resiliently resisted by said springs 12.

Any suitable construction of the universal joints may be employed in connection with my novel motor vehicle. Universal joints 20 and 21 may include any desirable plurality of conventional universal joints. However, I prefer to use at 20 and 21 single universal joints of the constant velocity type capable of effecting uniform angular speed in the driven shafts and capable of transmitting power through a considerable angular offset of the connected shafts without excessive friction and wear.

By virtue of the above described construction it is possible, as may be clearly seen from an examination of Fig. 1, to lower the propeller shaft a considerable distance, thereby enabling lowering the floor structure 29 of the vehicle and/or to decrease the height of the open bottom tunnel 30 which is usually provided in low set motor vehicle bodies for the purpose of permitting upward movements of the propeller shaft. I prefer to decrease the height of the tunnel 30 as well as to lower the entire body structure of the vehicle. It is to be noted that the frame 10 is bent downward intermediate its extremities to permit such lowering of the body. In addition, a similar tunnel which had to be provided in the floor structure of conventional vehicles right above the front end of the propeller shaft is entirely eliminated in the present motor vehicle, the same being a feature of great convenience for the operator of the vehicle. The floor structure between the front and the rear seats of the vehicle may be made slightly sloping toward the sides of the vehicle, whereby the apparent height of the tunnel 30 is still further decreased.

Numerous additional advantages are attained pursuant to the present invention. It is to be noted that in addition to the lowering of the entire body structure, the heaviest parts of the chassis, namely the propeller shaft 19 together with its housing 28, the transmission 14 and the rear part of the engine 13, are also lowered for a considerable distance and, therefore, the center of gravity of the entire motor vehicle is also lowered, which makes the entire vehicle more stable and safe particularly in following sharp curves at higher speeds. By bending the frame 10 downwardly and attaching the springs 12 closer to the center of gravity of the body, the turning moment which is produced by inertia of said body when accelerating from the start or when suddenly applying brakes is resisted in a much better way. This feature decreases tilting of the body rearwardly when accelerating from the start and forwardly when stopping upon sudden application of brakes. In addition, the elevated support for the body is much better adapted to resist the resultant force produced by the air resistance of the body structure. It is to be remembered that the air resistance of the body structure may constitute at higher speeds more than 80% of the total resisting force of a motor vehicle.

It is an important feature of the present invention that the operative angle between the transmission shaft 18 and the propeller shaft 19 is decreased, this angle reaching considerable magnitude in conventional structures and being increased when the final drive shaft extends forwardly and downwardly from the rear axle. This feature is further important by reason of the great reduction in operative stresses in the universal joint 20 achieved thereby.

I claim:

1. In a motor vehicle, an engine including a crankshaft arranged longitudinally of the vehicle and set at an angle to the horizontal, a transverse driving axle, a final drive shaft drivingly connected to the axle and extending downwardly therefrom and toward said engine, and a propeller shaft operatively connecting said crankshaft and said final drive shaft.

2. In a motor vehicle, an engine including a crankshaft arranged longitudinally of the vehicle and set at an angle to the horizontal, a transverse driving axle, a final drive shaft drivingly connected to the axle and extending downwardly therefrom and toward said engine, and a propeller shaft operatively connecting said crankshaft and said final drive shaft, said propeller shaft being arranged substantially parallel to the ground plane.

3. In a motor vehicle, an engine including a crankshaft arranged longitudinally of the vehicle and set at an angle to the horizontal, a transverse driving axle, a final drive shaft drivingly connected to the axle and extending downwardly therefrom and toward said engine, and a propeller shaft operatively connecting said crankshaft and said final drive shaft, the major axis of said propeller shaft forming with respect to the major axis of the final drive shaft an angle the vertex of which is directed downward.

4. In a motor vehicle, an engine including a crankshaft arranged longitudinally of the vehicle and set at an angle to the horizontal, a transverse driving axle, a final drive shaft drivingly connected to the axle and extending downwardly therefrom and toward said engine, and a propeller shaft operatively connecting said crankshaft and said final drive shaft, the major axis of said propeller shaft forming with the major axis of the crankshaft an angle, the vertex whereof is directed downward.

5. In a motor vehicle, an engine including a crankshaft arranged longitudinally of the vehicle and set at an angle to the horizontal, a transverse driving axle, a final drive shaft drivingly connected to the axle and extending downwardly therefrom and toward said engine, and a propeller shaft operatively connecting said crankshaft and said final drive shaft, the major axis of said propeller shaft forming with the major axes of said crankshaft and said final drive shaft two included angles of less than 180 degrees.

6. In a motor vehicle, an engine including a crankshaft arranged longitudinally of the vehicle and set at an angle to the horizontal, a transverse driving axle, a final drive shaft drivingly connected to the axle and extending downwardly therefrom and toward said engine, and a propeller shaft operatively connecting said crankshaft and said final drive shaft, the major axis or said propeller shaft forming with the major axes of said crankshaft and said final drive shaft two included angles, the vertices of which are directed downward.

7. In a motor vehicle, an engine including a crankshaft arranged longitudinally of the vehicle and set at an angle to the horizontal, a transmission shaft arranged coaxially with respect to said crankshaft, a transverse driving axle, a final drive shaft operatively connected to said axle and extending downwardly therefrom and toward said engine, and a propeller shaft drivingly connecting said final drive shaft and said transmission shaft.

8. In a motor vehicle, a front mounted engine having a crankshaft, said crankshaft being set at an angle with respect to the ground plane, a transverse rear axle, a final drive shaft operatively connected to the axle and extending forwardly and downwardly therefrom at an angle to the horizontal, a propeller shaft having its major axis forming with respect to the major axis of the final drive shaft an included angle of less than 180 degrees, said propeller shaft drivingly connecting said crankshaft and said final drive shaft.

9. In a motor vehicle, a front mounted engine including a crankshaft arranged longitudinally of the vehicle and set at an angle to the horizontal, a transmission shaft arranged at the rear end of said crankshaft coaxially therewith and operatively connected thereto, a transverse rear axle, a final drive shaft drivingly connected to the axle and extending forwardly and downwardly therefrom at an angle to the horizontal, a horizontally extending propeller shaft operatively connecting said final drive shaft and said transmission shaft, the major axis of said propeller shaft forming respectively with the axes of said final drive shaft and said transmission shaft two included angles of less than 180 degrees, the respective vertices of said angles pointing downward.

10. In a motor vehicle, a front mounted engine including a crankshaft arranged longitudinally of the vehicle and set at an angle to the horizontal, a transmission shaft arranged at the rear end of said crankshaft coaxially therewith and operatively connected thereto, a transverse rear axle, a final drive shaft drivingly connected to the axle and extending forwardly and downwardly therefrom at an angle to the horizontal, a horizontally extending propeller shaft arranged between said transmission shaft and said final drive shaft, and a plurality of universal joints drivingly connecting the extremities of said propeller shaft to said transmission and said final drive shafts.

11. In a motor vehicle, a front mounted engine including a crankshaft arranged longitudinally of the vehicle and set at an angle to the horizontal, a transmission shaft arranged at the rear end of said crankshaft coaxially therewith and operatively connected thereto, a transverse rear axle, a final drive shaft drivingly connected to the axle and extending forwardly and downwardly therefrom at an angle to the horizontal, a horizontally extending propeller shaft arranged between said transmission shaft and said final drive shaft, and two constant speed universal joints arranged at the extremities of said propeller shaft and drivingly connecting the same to the transmission shaft and the final drive shaft.

12. In a motor vehicle, an engine including a crankshaft arranged longitudinally of the vehicle and set at an angle to the horizontal, a transverse driving axle, a final drive shaft drivingly connected to the axle and extending downwardly therefrom and toward said engine, a propeller shaft operatively connecting said crankshaft and said final drive shaft, and means for maintaining constant angularity between said propeller shaft and said final drive shaft.

13. In a motor vehicle, a front mounted engine including a crankshaft arranged longitudinally of the vehicle and set at an angle to the horizontal, a transmission shaft arranged at the rear end of said crankshaft coaxially therewith and operatively connected thereto, a transverse rear axle, a final drive shaft drivingly connected to the axle and extending forwardly and downwardly therefrom at an angle to the horizontal, a horizontally extending propeller shaft arranged between said transmission shaft and said final drive shaft, a plurality of universal joints drivingly connecting the extremities of said propeller shaft to said transmission and said final drive shafts, and means for maintaining constant angularity between said propeller shaft and said final drive shaft.

14. In a motor vehicle, a front mounted engine including a crankshaft arranged longitudinally of the vehicle and set at an angle to the horizontal, a transmission shaft arranged at the rear end of said crankshaft coaxially therewith and operatively connected thereto, a transverse rear axle, a final drive shaft drivingly connected to the axle and extending forwardly and downwardly therefrom at an angle to the horizontal, a horizontally extending propeller shaft arranged between said transmission shaft and said final drive shaft, a plurality of universal joints drivingly connecting the extremities of said propeller shaft to said transmission and said final drive shafts, and a rigid housing for said propeller and final drive shafts, said housing being rigidly secured to said axle by its rear end and universally connected to the transmission housing by its front end.

15. In a motor vehicle, a front mounted engine including a crankshaft arranged longitudinally of the vehicle and set at an angle to the horizontal, a transmission shaft arranged at the rear end of said crankshaft coaxially therewith and operatively connected thereto, a transverse rear axle, a final drive shaft drivingly connected to the axle and extending forwardly and downwardly therefrom at an angle to the horizontal, a horizontally extending propeller shaft arranged between said transmission shaft and said final drive shaft, a plurality of universal joints drivingly connecting the extremities of said propeller shaft to said transmission and said final drive shafts, and a rigid housing for said propeller and final drive shafts, said housing being rigidly secured to said axle by its rear end and universally connected to the transmission housing by its front end, said housing being made of two pieces separable at the rear universal joint.

16. In a motor vehicle, a front mounted engine including a crankshaft arranged longitudinally of the vehicle and set at an angle to the horizontal, a transmission shaft arranged at the rear end of said crankshaft coaxially therewith and operatively connected thereto, a transverse rear axle, a final drive shaft drivingly connected to the axle and extending forwardly and downwardly therefrom at an angle to the horizontal, a horizontally extending propeller shaft arranged between said transmission shaft and said final drive shaft, a rigid housing for said propeller shaft and said final drive shaft, said housing being rigidly secured to said axle by its rear end and universally connected to the transmission housing by its front end, and bearing means within said housing for operatively supporting said propeller and final drive shafts.

17. In a land motor vehicle, an engine including a power shaft, a propeller shaft drivingly connected with said power shaft, and a final drive shaft drivingly connected with said propeller shaft, said shafts being arranged in a vertical plane longitudinally of the vehicle, the axes of said power shaft and said final drive shaft forming an angle, the vertex whereof is directed downward, and said propeller shaft being disposed substantially horizontal.

18. In a power transmitting connection for motor vehicles wherein a low floor level and a low center of gravity is of essential importance, the combination comprising a transmission housing having a drive shaft extending therefrom, a drive for a pair of the wheels of said vehicle comprising a differential housing carrying a pinion shaft, said pinion shaft extending substantially in the direction of said drive shaft, means connecting said drive shaft and said pinion shaft comprising a propeller shaft, universal joints interposed respectively between the ends of said propeller shaft and said first named shafts, said combination being particularly characterized by said drive shaft being directed downwardly at an angle to the horizontal and said pinion shaft being likewise directed downwardly at an angle to the horizontal, the center lines of said first two named shafts extended intersecting one another below and at a point located between the ends of said propeller shaft when said vehicle is at rest.

19. In a power transmitting connection for motor vehicles wherein a low floor level is of essential importance, the combination comprising a transmission housing having a drive shaft extending rearwardly therefrom, a rear wheel drive comprising a differential housing carrying a forwardly extending pinion shaft, means connecting said drive shaft and said pinion shaft comprising a propeller shaft, universal joints interposed respectively between the ends of said propeller shaft and said first named shafts, said combination being particularly characterized by said rearwardly extending drive shaft being directed downwardly at an angle to the horizontal and said pinion shaft being likewise directed downwardly at an angle to the horizontal, the center lines of said first two named shafts extended intersecting one another below and at a point located between the ends of said propeller shaft when said vehicle is at rest.

20. In a motor vehicle drive connection between the forward transmission power shaft and the rear wheels, an arrangement comprising a differential connected with said wheels and having a pinion shaft extending forwardly and downwardly therefrom at an acute angle to the horizontal, and means including a universal joint for connecting the forward end of said pinion shaft with said forward transmission power shaft, said elements being particularly arranged to provide for lowering the floor of the vehicle.

21. In a power transmitting connection for motor vehicles wherein a low floor level is of essential importance, the combination comprising a transmission housing having a drive shaft extending rearwardly therefrom, a rear wheel drive comprising a differential housing carrying a forwardly extending pinion shaft, means connecting said drive shaft and said pinion shaft comprising a propeller shaft, universal joints interposed respectively between the ends of said propeller shaft and said first named shafts, said combination being particularly characterized by said forwardly extending pinion shaft being directed downwardly at an acute angle to the horizontal when said vehicle is at rest, whereby said propeller shaft joins with said pinion shaft through said universal joint at a lower elevation than would be the case were said forwardly extending pinion shaft maintained normally in a horizontal plane.

JOHN TJAARDA.